Patented July 26, 1938

2,124,894

UNITED STATES PATENT OFFICE 2,124,894

REMOVAL OF CELLULOSE DERIVATIVES FROM SUSPENSIONS CONTAINING THEM

Stephen C. Pool and Maurice L. Piker, Rochester, N. Y., assignors to Eastman Kodak Company, Rochester, N. Y., a corporation of New Jersey No Drawing. Application November 5, 1937, Serial No. 173,010

12 Claims. (Cl. 260—148)

This invention relates to the separation of cellulose derivatives, particularly cellulose nitrate from aqueous suspensions from which the derivative is difficult to remove, by adding a water-soluble alkaline earth metal salt of a monobasic acid thereto. This invention relates more particularly to the suspensions formed in the recovery of cellulose nitrate and solvents from waste subbing solutions in the making of photographic film or from the leaching solvents which have been used to remove the subbing layer in film scrap recovery processes, which suspensions were formed by precipitating the major portion of the nitrocellulose from its solution with water.

Many types of photographic film are composed of a base of an organic acid ester of cellulose, such as cellulose acetate or cellulose acetate propionate, and a subbing layer comprising nitrocellulose to facilitate the adherence of a photographic emulsion to the film base. In the recovery of scrap film of this nature the usual procedure is to remove the emulsion, made up principally of gelatin, by means of hot water and then to treat the degelatinized scrap with a leaching solvent, such as methyl alcohol, aqueous acetone or a mixture of methyl alcohol and acetone to dissolve the nitrocellulose subbing layer from the scrap. Although the major portion of the cellulose nitrate in solution in the leaching solvent is precipitated out with water, some of the cellulose ester remains in suspended form in the liquid and cannot be separated therefrom either by filtering or centrifuging without some further treatment. The same applies to recovery of nitrocellulose and solvents from waste subbing solutions.

In the applying of a subbing layer of nitrocellulose to film base in the making of photographic film, a large amount of the subbing solution consisting of the nitrocellulose and the solvent therefor goes to waste and requires reworking to recover the solvents and the nitrocellulose therein. To separate the nitrocellulose from the waste subbing solution has heretofore presented a serious problem. The type of solutions which may be treated in accordance with our invention, after precipitating out the nitrocellulose with water, are described in U. S. Patent No. 2,014,547 of George S. Babcock.

One object of our invention is to provide a method of converting cellulose nitrate in suspension in an aqueous liquid to a form in which it can be more easily removed therefrom. Another object of our invention is to provide a method of removing cellulose derivatives, whether cellulose nitrate, cellulose acetate, another cellulose ester or a cellulose ether, from their suspensions in solvents having a water content.

We have found that if to an aqueous suspension of a cellulose derivative a small amount of a solution of water-soluble alkaline earth metal salt of a monobasic acid is added, the major portion of the cellulose derivative present in the suspension is converted to a form in which it can be removed by centrifuging or by filtration. Included in the alkaline earth metals are barium, strontium, calcium and magnesium. Any of the water soluble salts of these metals combined with a monobasic acid, may be employed.

Apparently this action of these alkaline earth metal salts differs in nature from that ordinarily taking place when an electrolyte is added to a colloidal suspension, because of the much greater effectiveness of these salts of divalent metals, than the salts of the metals of other valences. If the action was that ordinarily regarded as the breaking-up of a colloidal suspension in accordance with the teachings in the literature relating thereto, the salts of the trivalent metals, such as of aluminum or iron would be more effective. We have found that by the use of the water-soluble alkaline earth metal salts, the quantities necessary for breaking up the emulsion are much less than the quantities of other salts which might be used and that these salts are eminently effective for the separating of the cellulose derivatives from their suspensions. We have found that ordinarily only .006 pound of calcium chloride is required to coagulate the nitrocellulose in one gallon of waste sub-solution or leaching solvent containing it, which solvent has been mixed with water equal to ⅔ its volume, or in other words, 1⅔ gallons of a mixture containing 40% added water by volume. When the suspension has been treated with the alkaline earth metal salt, the mass may be filtered through ordinary filter cloth, yielding a clear filtrate containing less than .01% cellulose nitrate. The following example illustrates our invention as applied to a waste subbing solution:

To a tank of waste sub-solution from which much of the nitrocellulose had been precipitated with 40% of water, which tank contained a total of 4,650 gallons of the aqueous suspension of nitrocellulose at room temperature, was added approximately 20 quarts of a 30% solution of calcium chloride. This corresponded to .0035 pound of anhydrous calcium chloride per gallon of mixture containing 40% water or .006 pound per gallon of the solution prior to the addition of the water. After the addition of the calcium chloride solution, the contents of the tank were mixed thoroughly and then the nitrocellulose was allowed to settle therefrom by permitting the mass to stand for five hours. After this settling, about 6/7 of the contents of the tank were drawn off from the upper portion of the tank. This liquid was centrifuged and found to contain less than .01% of nitrocellulose. The lower portion of the mixture, which contained practically all of the precipitated nitrocellulose, was filtered through a 100 mesh wire filter, with suction, and the effluent was mixed with the liquid from the upper portion of the tank before the centrifuging. Instead of settling and centrifuging, the precipitated nitrocellulose may be separated from the liquid by filtering, as by a filter press.

The liquid from which the nitrocellulose has been thoroughly removed can now be subjected to distillation to recover the solvents therefrom without the inconvenience or even danger which would result from the presence of nitrocellulose therein. The nitrocellulose recovered may be washed and dried and reused in subsequent processes of subbing film or for any other purpose to which it is adapted.

The following table lists some of the salts which may be employed in accordance with our invention and the most effective weight of the anhydrous salt which may be used to fully coagulate the nitrocellulose in 100 cc. of a mixture of 60% waste subbing solution and 40% water:

| Alkaline earth metal salt | Weight of anhydrous salt necessary to cause coagulation |
|---|---|
| Barium chloride | grams .02 |
| Strontium chloride | do .024 |
| Calcium nitrate | do .034 |
| Calcium chloride | do .024 |
| Magnesium chloride | do .030 |

Although these quantities are most effective, nevertheless, if desired, greater quantities or even somewhat lesser quantities of these salts may be employed and the method would still be within the scope of our invention. Generally speaking about .02 gram or more of the alkaline earth metal salt per 100 cc. of the aqueous nitrocellulose suspension is effective.

The upper limit of salt which can be used in accordance with our invention is governed only by practical considerations. If a great quantity of salt were used, although it would aid in the separation of the nitrocellulose from the suspension, the difficulties involved in the recovery of solvent from the remaining liquid due to the presence of a large quantity of the salt would hinder the most efficient operation of the solvent recovery process, although the separation of the nitrocellulose from the aqueous suspension should take place satisfactorily.

Thus it may be seen that our invention is of value both in the making of photographic film in which a subbing layer is applied and in the recovery of scrap photographic film in which the subbing layer is to be removed. In the immersion method of applying the subbing layer, both the method and the compositions having been described in Babcock Patent No. 2,014,547, there is a considerable amount of the solvent containing a small proportion of cellulose nitrate which goes to waste. To recover this solvent it is desirable to remove the nitrocellulose therefrom before distillation or otherwise applying heat thereto. The major portion of this cellulose nitrate separates out by mixing a precipitating amount of water therewith and then separating out as much of the nitrocellulose as possible. The nitrocellulose which remains is present in suspended form and our invention is particularly adapted to the removal of the small amount of nitrocellulose from the suspension.

In the recovery of photographic film scrap, the gelatine photographic emulsion, if present, is removed by means of hot water. The scrap is then subjected to the action of a leaching solvent to remove the subbing layer, the major portion of which separates out when the mass is mixed with a large volume of water. Even after the precipitated nitrocellulose is removed there is still a small proportion of the ester in suspension in the liquid.

Our invention is particularly adapted to the removal of the nitrocellulose from this suspension so that the solvent employed in the leaching may be recovered and the nitrocellulose obtained may be reused in subsequent operations.

The aqueous suspension may be that resulting from precipitating out the nitrocellulose with a large excess of water from the leaching solvent after film scrap has been leached in accordance with the leaching method described in Reid application Serial No. 125,116 filed February 1, 1937. To this suspension may be added a small amount of calcium chloride, or other alkaline earth metal salt as prescribed, in an aqueous solution and the whole is then allowed to stand until the nitrocellulose which has been thrown out of suspension, settles. The liquid can be separated from the solid nitrocellulose by centrifuging and the effluent is then ready for introduction into a distillation column to recover the solvent therefrom. The liquid which is fed to the still consists only of leaching solvent and water with a small amount of water-soluble salt without more than a trace of nitrocellulose; more than a trace would be not only undesirable but dangerous.

The nitrocellulose recovered by our method may be mixed with that which has been separated from the leaching solvent by precipitation with water. Taken without such mixing it is adapted for the same uses for which the nitrocellulose from the precipitation is employed.

We claim:

1. The method of separating a cellulose derivative from its colloidal suspension in a mixture of solvent and water which comprises adding to the suspension at least .02% of an alkaline earth metal salt of a monobasic acid so as to make the cellulose derivative more easily separable and then separating the cellulose derivative from the aqueous liquid.

2. The method of removing nitrocellulose from its aqueous suspension which comprises adding to the suspension at least .02% of an alkaline earth metal salt so as to make the nitrocellulose more easily separable and then removing the nitrocellulose from the aqueous liquid.

3. A method of recovering nitrocellulose from scrap photographic film in which the nitrocellulose has been used as a subbing layer which comprises removing the gelatin from the scrap film by means of hot water, treating the film scrap with a leaching solvent, precipitating the major portion of the nitrocellulose from the leaching solvent with water, treating the remaining liquid containing nitrocellulose in suspension, with at least .02% of an alkaline earth metal salt of a monobasic acid so as to make the nitrocellulose more easily separable and then separating the nitrocellulose from the aqueous liquid.

4. A method of recovering nitrocellulose from a waste solution thereof in a volatile organic solvent which comprises mixing the solution with a precipitating amount of water, separating the precipitated nitrocellulose therefrom, then adding to the resulting liquid at least .02% of an alkaline earth metal salt of a monobasic acid, so as to make the nitrocellulose more easily separable and separating the nitrocellulose therefrom.

5. A method of separating nitrocellulose from its colloidal suspension in an aqueous liquid which comprises adding to the suspension at least .02% of a calcium salt of a monobasic acid so as to make the nitrocellulose more easily separable and then separating the nitrocellulose from the aqueous liquid.

6. A method of separating nitrocellulose from its colloidal suspension in an aqueous liquid which comprises adding to the suspension at least .02% of calcium chloride so as to make the nitrocellulose more easily separable and then separating the nitrocellulose from the aqueous liquid.

7. The method of separating nitrocellulose from its colloidal solution in a mixture comprising methyl alcohol, acetone and water which comprises adding at least .02% of calcium chloride thereto so as to make the nitrocellulose more easily separable and then separating the nitrocellulose from the aqueous liquid.

8. The method of separating nitrocellulose from its colloidal solution in a mixture comprising methyl alcohol, acetone and water which comprises adding at least .02% of calcium chloride thereto so as to make the nitrocellulose more easily separable and then filtering the mass.

9. The method of separating nitrocellulose from its colloidal solution in a mixture comprising methyl alcohol, acetone and water which comprises adding at least .02% of calcium chloride thereto so as to make the nitrocellulose more easily separable and then centrifuging the mass.

10. A method of separating nitrocellulose from its colloidal suspension in an aqueous liquid which comprises adding to the suspension at least .02% of barium chloride so as to make the nitrocellulose more easily separable and then separating the nitrocellulose from the aqueous liquid.

11. A method of separating nitrocellulose from its colloidal suspension in an aqueous liquid which comprises adding to the suspension at least .02% of magnesium chloride so as to make the nitrocellulose more easily separable and then separating the nitrocellulose from the aqueous liquid.

12. The method of removing nitrocellulose from its colloidal suspension in an aqueous liquid which comprises adding thereto at least .02% of an alkaline earth metal salt of a monobasic acid so as to make the nitrocellulose more easily separable allowing the mass to settle until the nitrocellulose has settled out, drawing off the clear portion of the mass and centrifuging it and then filtering the remainder of the mass containing the precipitated nitrocellulose to remove the same.

STEPHEN C. POOL.
MAURICE L. PIKER.